G. G. BLANDFORD.
VEHICLE SPRING.
APPLICATION FILED MAR. 19, 1917.
1,264,148.
Patented Apr. 30, 1918.
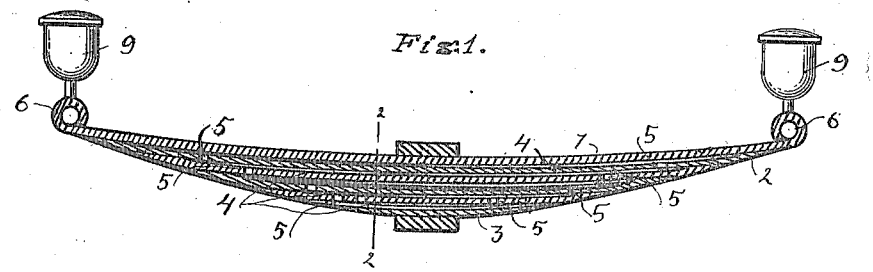
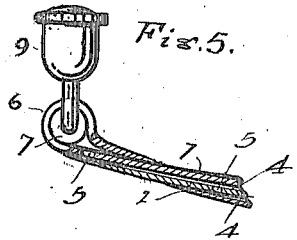
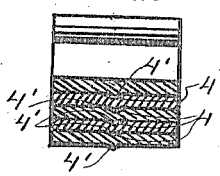
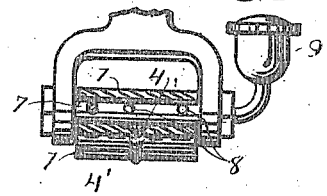
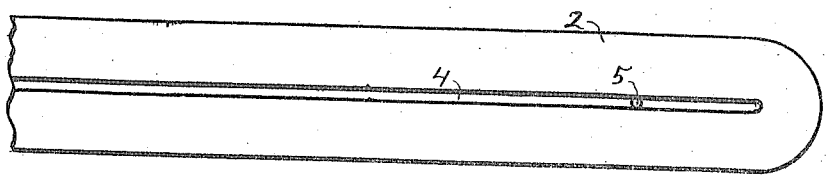
Glen G. Blandford
Idris J. Cilley
Attorney

UNITED STATES PATENT OFFICE.

GLEN G. BLANDFORD, OF GRAND RAPIDS, MICHIGAN.

VEHICLE-SPRING.

1,264,148.  Specification of Letters Patent.  Patented Apr. 30, 1918.

Application filed March 19, 1917. Serial No. 155,939.

*To all whom it may concern:*

Be it known that I, GLEN G. BLANDFORD, a citizen of the United States, residing at Grand Rapids, in the county of Kent and State of Michigan, have invented certain new and useful Improvements in Vehicle-Springs, of which the following is a specification.

My invention relates to improvements in vehicle springs, and more especially in springs for use upon heavy automobile drays, and its object is to provide a more perfect means for lubricating the surfaces of the springs, and thus greatly reduce the friction between adjacent surfaces of this class of springs.

I attain this object by the use of the several elements shown in the accompanying drawing, in which Figure 1 is a central longitudinal section of a spring showing the means I have adopted for bringing about the desired object, as stated. Fig. 2 is a transverse section of a spring, practically on the line 2—2 of Fig. 1. Fig. 3 is a plan of one end of a leaf showing the groove and opening for facilitating the lubrication. Fig. 4 is a transverse section of the extreme end of the spring showing how the oiling appliances may be attached through the supporting pin in the stirrup. Fig. 5 is a sectional side elevation of one end of the spring showing the oil cup as mounted in the pin.

Similar reference numerals indicate similar parts throughout the several views.

1, represent the main spring leaves; 2 represent the intermediate leaves, and 3 represent the crown leaves of the spring. My invention consists in forming shallow channels 4, longitudinally of the center of the leaves, in such a manner that oil passing to the springs from any oil reservoir, as 9, at an elevated position on the springs, will pass into, and flow along in the channels to the lowest point in the springs, passing through the openings 5 to each succeeding leaf of the spring. By this means oil entering at a desired point will be equally distributed over the entire surface of each of the spring leaves and perfect lubrication will be attained.

In the construction of these springs I form a rib 4' upon the lower side of each intermediate leaf of the spring, slightly smaller than the channel, but exactly registering therewith, so that a quantity of oil will be forced through the channels and sidewise therefrom, thus insuring the perfect lubrication of all parts of the surfaces of the several leaves in the spring.

In Fig. 4 I have shown, more plainly, how the oil cup is mounted in the supporting bolts at the ends of the springs. It will be readily understood that the oil will pass from the cups 9 through the bolts 7, longitudinally, and out of the bolts through the openings 8 into the opening in the end of the spring for the reception of the pin or bolt 7, and thence through the openings 5 to the next lower spring leaf, and thence through the channel 4 to the opening 5, all as hereinbefore described and for the purpose set forth, and as indicated in Fig. 5.

What I claim as new, and desire to secure by Letters Patent of the United States, is:

In combination, a vehicle spring made up of several leaves having properly located oil conducting channels formed therein and communicating with each other and having openings through the ends for supporting bolts, said openings communicating with one of said channels, stirrups for supporting said spring, said stirrups having openings corresponding with the openings through the spring, hollow supporting bolts having lateral openings to the surface, passed through the openings in the stirrups and the ends of the spring, and oil cups connected with the supporting bolts in such a manner that oil will pass from said cups through the bolts and into the oil channels in the spring to lubricate the adjacent surfaces of the leaves.

Signed at Grand Rapids, Michigan, March 12, 1917.

GLEN G. BLANDFORD.